United States Patent Office 3,390,116

Patented June 25, 1968

3,390,116

PROCESS FOR THE MANUFACTURE OF SOLUTIONS OF PREPOLYMERS OF A DIALLYLPHTHALATE

Daniel Porret, Basel, Switzerland, assignor to Ciba Limited, Basel, Switzerland, a Swiss company No Drawing. Filed Oct. 15, 1964, Ser. No. 404,175
Claims priority, application Switzerland, Oct. 25, 1963, 13,136/63
8 Claims. (Cl. 260—32.8)

ABSTRACT OF THE DISCLOSURE

Solutions of prepolymers of a diallylphthalate can be obtained directly by an inexpensive route by performing the polymerisation in the presence of a liquid ketone, such as acetone or methylethyl ketone, as solvent and of a catalyst capable of forming free radicals, such as hydrogen peroxide, ensuring by the addition of a small amount of a strong acid that the polymerisation solution is always of a weakly acid reaction, i.e. that its pH value remains at 2 to 5.

It is known to manufacture prepolymers of a diallylphthalate, such as diallyl-orthophthalate, which are soluble in organic solvents, such as lower ketones, esters, halogenated hydrocarbons or aromatic hydrocarbons, by controlled polymerisation of the diallylphthalate in the mass in the presence of a catalyst capable of forming free radicals, such as organic peroxides, whereupon the prepolymer formed is precipitated from its solution in the unreacted monomer by adding a medium in which the monomer is soluble but the prepolymer is insoluble. Such processes have been described, for example, in U.S. Patent No. 3,030,341, patented Apr. 17, 1962 to Paul E. Willard, Baltimore, Md., U.S.A., and in Austrian Patent No. 225,424, granted June 15, 1962 to Charles Adam Heiberger, Princeton, N.J., U.S.A., FMC Corporation, New York, N.Y., U.S.A. However, the processes referred to only give conversion rates of diallylphthalate to prepolymer not exceeding 25 to 30% by weight; when the conversion is prolonged, gel formation sets in and the polymer formed is insoluble in organic solvents.

To achieve higher degrees of conversion it has been proposed in German Patent No. 1,067,216, granted Mar. 10, 1962, to Charles Adam Heiberger et al., FMC Corporation, New York, N.Y., U.S.A., to use substituted benzyl alcohols for regulating the chain length. The object of Swiss Patent No. 363,807, granted Aug. 15, 1962, to Charles Adam Heiberger, FMC Corporation, New York, N.Y., U.S.A., is identical, the polymerisation catalyst used being hydrogen peroxide which, at the same time, acts as chain length regulator. The highest degrees of conversion thus reached are slightly above 50% by weight, and substantial amounts of catalyst and regulator, for example over 6% by weight of benzoyl peroxide and over 30% by weight of regulator, referred to the weight of monomer, are required.

The prepolymer obtained by this known process is used by industry in many cases, for example in the manufacture of laminates, in the form of solutions in organic solvents which additionally contain a proportion of the monomer. However, the preparation of such solutions suitable for industrial use is costly because it has not been possible in the past to prepare such solutions directly by prepolymerising diallylphthalate in an organic solvent. It has always been necessary to use the costly detour of first isolating the prepolymer from the reaction mixture, for example by precipitation, and then dissolving it in the organic solvent, optionally together with the desired amount of monomer.

It has now been found that, quite unexpectedly, industrially useful solutions of prepolymers of a diallylphthalate can be obtained directly by an inexpensive route by performing the polymerisation in the presence of a liquid ketone, such as acetone or methylethyl ketone, as solvent and of a catalyst capable of forming free radicals, such as hydrogen peroxide, ensuring by the addition of a small amount of a strong acid that the polymerisation solution is always of a weakly acid reaction, i.e. that is pH value remains at 2 to 5.

The new process offers the further advantage that the prepolymerisation of diallylphthalate can be taken to substantially higher degree of conversion that is possible with the known processes. It is extremely surprising that a good yield can be achieved at all when diallylphthalate is polymerised in a solvent, since by the process of U.S. Patent No. 3,030,341, patented Apr. 17, 1962 to Paul E. Willard, Baltimore, U.S.A., for a polymerisation period exceeding 10 hours, either in the mass or in the presence of a small amount of a lower aliphatic alcohol and at a reaction temperature above 100° C., the best degree of conversion attainable is only 25 to 30%, using hydrogen peroxide as polymerisation catalyst. When this known process is taken to a degree of conversion above 30 to 35%, gel formation sets in.

It is therefore all the more surprising that the present process makes it possible to attain a degree of conversion of over 60%, with the polymerisation being performed in a ketone as solvent at a reaction temperature of, for example, slightly higher than 60° C. and for an approximately equal reaction period.

The diallylphthalate prepolymers obtained by the new process differ from those obtained by the known processes by their lower average molecular weights (about 1000). It is assumed that a certain small proportion of the ketone is incorporated in the prepolymers and that the latter are, therefore, so-called telomers of the formula

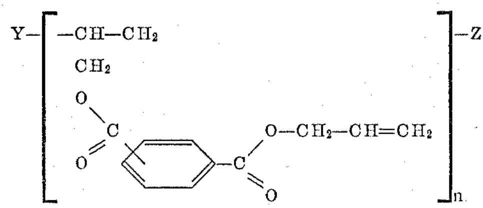

where Y and Z indicate the atoms and atomic groupings formed by the splitting of the ketone as telogen (Z is generally a hydrogen atom and Y is the residue of the ketone molecule) and where $n$ is a small integer, in general from 2 to 50. The prepolymers and telomers obtained by the process of this invention can be put to the same practical uses as the known diallylphthalate prepolymers. The solutions of the prepolymer in the liquid ketone, for example acetone, obtained when the polymerisation is discontinued, have the additional important advantage that they are of a very low viscosity and are stable and that they may be used as they are for the manufacture of moulding compositions and laminates without prior isolation of the prepolymer, which is necessary with the hitherto known processes.

Accordingly, the present invention provides a process for the manufacture of solutions containing prepolymers of a diallylphthalate of the formula

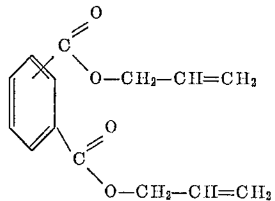

or coprepolymers of such diallylphthalates with other copolymerisable monomers, in addition to possibly unreacted monomers, in a ketone that is liquid at room temperature.

According to the present process a solution of a diallylphthalate by itself or of a diallylphthalate together with another copolymerisable monomer, in a ketone that is liquid at room temperature, preferably in a lower aliphatic ketone, is reacted in the presence of a catalyst capable of forming free radicals, preferably hydrogen peroxide, and of a small amount of a strong acid, at an elevated temperature, preferably until at least 60%, preferably until at least 90%, by weight of the monomer initially present in the reaction solution has been converted into a prepolymer.

Suitable diallylphthalates are diallylisophthalate, terephthalate and especially orthophthalate.

The ketone which is liquid at room temperature serves at the same time as solvent for the reaction, and as regulator.

There may be used aromatic ketones, such as acetophenone, cycloaliphatic ketones such as cyclopentanone, cyclohexanone and methylcyclohexanones, and especially lower aliphatic ketones such as acetone, methylethyl ketone, methylisopropyl ketone, diisopropyl ketone, methylisobutyl ketone or diisobutyl ketone. If desired, part of the ketone may be replaced by an inert organic solvent.

As polymerisation catalyst any one of the usual catalysts capable of forming free radicals may be used; there may be mentioned hydrazine derivatives, for example, hydrazine hydrochloride, alihpatic azo compounds such as $\alpha,\alpha'$-azoisobutyrodinitrile and organic peroxides or persalts, for example peracetic acid, acetyl peroxide, chloracetyl peroxide, trichloracetyl peroxide, benzoyl peroxide, chlorobenzoyl peroxide, benzoyl acetyl peroxide, propionyl peroxide, fluorochloropropionyl peroxide, lauryl peroxide, cumene hydroperoxide, tertiary butyl hydroperoxide, di-tertiary butyl peroxide, di-tertiary amyl peroxide and para-methane hydroperoxide, though preferred use is made of hydrogen peroxide.

It is of advantage to use an amount of about 0.05 to 10% by weight of the catalyst, referred to the total weight of the monomer or monomers, and the whole amount of catalyst may be added at the outset or, alternatively, it may be added in portions during the progress of the prepolymerisation.

The reaction must be performed in a weakly acid medium, advantageously within the pH range from 2 to 4. For this purpose a small amount, preferably 0.05 to 5% by weight referred to the total weight of the monomer or monomers, of a strong acid, for example hydrochloric, perchloric, benzenesulphonic or especially para-toluenesulphonic acid is added.

The reaction is carried out at an elevated temperature, preferably ranging from 50° to 150° C. The pressure to be used must be capable of ensuring that the reactants remain in the liquid phase. The process may be conducted continuously or batchwise.

As other monomers that may optionally be prepolymerised together with the diallylphthalate, there are suitable those which contain a carbon-to-carbon double bond, especially an $H_2C{=}C{-}$ group; there may be mentioned polymerisable olefines, for example, butene, isobutylene, amylene, hexylene, and butadiene; halogenated olefines, such as vinylfluoride, fluoroprene, vinylidenefluoride, difluoroethylene, trifluoroethylene, tetrafluoroethylene, difluoromonochlorethylene, dichloromonofluorethylene, trifluorochlorethylene, difluoro dichlorethylene, perfluoropropene and perfluorobutene; vinylchloride, vinylidenechloride, trichlorethylene, chloroprene, tetrachlorethylene and perchloroprene; vinyl ethers such as vinyl methyl ether, vinyl ethyl ether and vinyl phenyl ether; vinylaryl compounds such as styrene, $\alpha$-methylstyrene and other substituted styrenes; furthermore compounds of the acrylic acid series, such as esters of acrylic or methacrylic acid with alcohols or phenols, for example methylacrylate, ethylacrylate, butylacrylate, dodecylacrylate, methylmethacrylate, acrylonitrile and methacrylonitrile, amides of acrylic and methacrylic acid; furthermore analogous derivatives of $\alpha$-fluoroacrylic acid, $\alpha$-chloroacrylic acid, crotonic acid, maleic acid or fumaric acid; allyl compounds other than diallylphthalates, for example diallylsuccinate, triallylcyanurate and chlorallylacetate.

It is of course possible to manufacture also ternary, quaternary or higher coprepolymers by prepolymerisation of diallylphthalates with two or more different other monomers. It is also possible to manufacture coprepolymers by prepolymerising different diallylphthalates.

The prepolymer solutions obtained by the present invention may be used as they are for a variety of purposes.

They are specially suitable for the manufacture of moulding compositions and laminates, in the presence of the known peroxide curing agents, fillers, reinforcing agents, mould separating lubricants, pigments, dyestuffs, stabilisers and, if desired, further monomers and/or prepolymers.

Parts and percentages in the following examples are by weight and temperatures are shown in degrees centigrade. The viscosities were measured at 20° C.

Example 1

A mixture of 1127 g. of diallyl-orthophthalate, 984.5 g. of methylethyl ketone, 3.7 g. of para-toluenesulphonic acid and 16.6 g. of hydrogen peroxide (of 65% strength) was heated for 9 hours at the boil while being stirred and refluxed at an internal temperature of 81° C. After 2, 4, 6 and 8 hours each another 2 g. of hydrogen peroxides (65%) was added. The reaction mixture was then cooled, to yield 2143 g. of a yellow solution. This solution produced a precipitate on adding 0.9 ml. of methanol to 3 g. of the reaction mixture. The solution had a viscosity of 90 centipoises. A specimen of this solution was evaporated under vacuum. The residue was a solid substance which was flexible and slightly tacky. The resulting solution contains only a little remnant of unpolymerised diallylphthalate and can be used as it is for the manufacture of laminates or moulding powders. If desired, the resulting acetonic solution may be neutralised before use by agitating it with precipitated calcium carbonate and then filtering it.

Example 2

A mixture of 980 g. of diallyl-orthophthalate, 856 g. of acetone, 3.2 g. of para-toluenesulphonic acid and 9.6 g. of hydrogen peroxide (65% strength), was heated for 13 hours at the boil while being stirred and refluxed at an internal temperature of 68° C. After 2, 4, 6 and 10 hours each another 8 g. of 65% hydrogen peroxide was added, and the reaction mixture was then cooled. There were obtained 1764 g. of a yellow solution. This solution produced a precipitate when 0.9 ml. of methanol was added to 3 g. of the reaction mixture. The viscosity of the solution obtained was 34 centipoises. When a specimen was evaporated under vacuum, a solid, elastic, slightly tacky substance was left. The solution can be used as it is for the manufacture of laminates or moulding powders.

Example 3

A mixture of 220.5 g. of diallyl-orthophthalate, 24.5 g. of methacrylic acid methyl ester (stabilised with hydroquinone), 214 g. of acetone, 0.8 g. of para-toluenesulphonic acid and 2.4 g. of 65% hydrogen peroxide was heated for 12 hours at the boil while being stirred and refluxed at an internal temperature of 67° C. After 2, 4, 6, 8 and 10 hours each another 1 g. of 65% hydrogen peroxide was added. After having discontinued the reaction by cooling, 398 g. of a yellow solution having a viscosity of 45 centipoises were obtained. This solution produced a precipitate on addition of 1.2 ml. of methanol to 3 g. of the reaction mixture. This solution can be used as it is for the manufacture of laminates and moulding powders.

Example 4

A mixture of 245 g. of diallylphthalate, 214 g. of acetone, 0.7 g. of perchloric acid of 70% strength and 4.8 g. of hydrogen peroxide of 65% strength was heated for 15 hours at the boil while being stirred and refluxed at an internal temperature of about 65° C. After 2, 4, 6, 8 and 10 hours each another 1 g. of 65% hydrogen peroxide was added, whereupon the reaction mixture was cooled, to yield 480 g. of a yellow solution. This solution produced a precipitate when 0.9 ml. of methanol was added to 3 g. of the reaction mixture. The viscosity of the solution was 20 centipoises. On evaporation of the solution at 70° C. under vacuum a substantially solid, tacky resin was obtained. The resulting solution can be used as it is for the manufacture of laminates; if necessary, it may be neutralised with sodium carbonate prior to use.

Example 5

A mixture of 1078 g. of diallylisophthalate, 942 g. of acetone, 3.59 g. of para-toluenesulphonic acid and 21 g. of hydrogen peroxide of 65% strength was heated for 5 hours at the boil while being stirred and refluxed at an internal temperature of 65° C. After 4 hours, another 4 g. of 65% hydrogen peroxide was added. After cooling, there were obtained 2010 g. of a yellow, clear solution of low viscosity. This solution produced a precipitate when 1.0 ml. of methanol was added to 3 g. of the reaction mixture. The viscosity was 15 centipoises. This solution is not indefinitely stable; after one week its viscosity rose to 27 centipoises. This solution can be used as it is for the manufacture of laminates.

Example 6

A mixture of 245 g. of diallylphthalate, 214 g. of diisobutyl ketone, 0.8 g. of para-toluenesulphonic acid and 3.6 g. of hydrogen peroxide of 65% strength was heated and stirred for 2 hours at 100° C. After one hour another 1 g. of 65% hydrogen peroxide was added. On cooling, a viscous, faintly yellowish, clear solution was obtained. This solution produced a precipitate when 0.8 ml. of methanol was added to 3 g. of the reaction mixture. From this solution the prepolymer can be precipitated with methanol. This solution can be used as it is for the manufacture of laminates.

Example 7

A mixture of 245 g. of diallylphthalate, 214 g. of cyclohexanone, 0.8 g. of para-toluenesulphonic acid and 4.8 g. of hydrogen peroxide of 65% strength was heated and stirred for 15 hours at 65° C. After 2, 4, 6, 8, 10 and 12 hours each another 1 g. of 65% hydrogen peroxide was added. After cooling, a yellow viscous liquid was obtained which contained a small proportion of water. Evaporation of this solution furnished a solid resin in a yield of 120% (referred to the diallylphthalate used), which proves that a certain amount of cyclohexanone was incorporated in the product during the polymerisation. This product can be used for the manufacture of laminates.

What is claimed is:

1. A process for the manufacture of solutions consisting essentially of prepolymers of a diallylphthalate of the formula

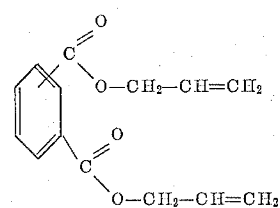

in a ketone that is liquid at room temperature, wherein the solution of the momomeric diallylphthalate in a ketone that is liquid at room temperature, is reacted at 50 to 150° C. in the presence of a catalyst capable of forming free radicals and of 0.05 to 10% by weight based on the total weight of monomers of a strong acid as reaction accelerator.

2. A process as claimed in claim 1, wherein the solvent used is a lower aliphatic ketone of at most 7 carbon atoms.

3. A process as claimed in claim 2, wherein a member selected from the group consisting of acetone and methylethyl ketone is used as the solvent.

4. A process as claimed in claim 1, wherein diallylorthophthalate is used as the diallylphthalate.

5. A process as claimed in claim 1, wherein hydrogen peroxide is used as the catalyst, capable of forming free radicals.

6. A process as claimed in claim 1, wherein paratoluenesulphonic acid is used as the reaction accelerator.

7. A process as claimed in claim 1, wherein the reaction is continued until at least 60% by weight of the monomer initially present in the reaction solution has been converted into a prepolymer.

8. A process as claimed in claim 7, wherein the reaction is continued until at least 90% by weight of the monomer initially present in the reaction solution has been converted into a prepolymer.

References Cited

UNITED STATES PATENTS 2,973,337 2/1961 Stroh et al. ---------- 26—89.1

MORRIS LIEBMAN, *Primary Examiner.*

JULIUS FROME, *Examiner.*

L. T. JACOBS, *Assistant Examiner.*